Figure 1:

March 22, 1949. H. T. NEHER ET AL 2,464,826

ACRYLIC RESIN LAMINATION

Filed Dec. 30, 1943

INVENTORS
Harry T. Neher &
La Verne N. Bauer
BY
ATTORNEY.

Patented Mar. 22, 1949

2,464,826

UNITED STATES PATENT OFFICE 2,464,826

ACRYLIC RESIN LAMINATIONS

Harry T. Neher, Bristol, and La Verne N. Bauer, Philadelphia, Pa., assignors to Rohm & Haas Company, Philadelphia, Pa., a corporation of Delaware Application December 30, 1943, Serial No. 516,178

10 Claims. (Cl. 154—43)

This invention deals with laminated structures having a minimized tendency to shatter, separate, or delaminate at low temperatures, even when struck or pierced with an object, such as a bullet. More particularly, this invention deals with laminated structures containing one or more acrylic resin sheets firmly bonded to a plasticized vinyl acetal resin as an interleafing layer of the structure. With still greater particularity, this invention deals with laminated structures in which one or more sheets of transparent acrylic resin are bonded to at least one layer of plasticized vinyl acetal resin by means of an acrylic polymer prepared with about 5% to about 25% of an acrylic acid.

Acrylic resins have become widely used in the form of sheets for the purpose of providing windows, windshields, turrets, noses, and the like in aircraft. Because of their low density, optical clarity, freedom from color and haze, and capacity for being shaped into curved surfaces, their use has been generally satisfactory and advantageous, especially for making or completing enclosures in aircraft. While acrylic resin sheets have been quite resistant to shattering over a wide range of temperature, provided that no pressure difference existed on the two sides of the sheets, the advent of pressurized enclosures, as in sealed cabins in aircraft for high altitude flying, has created new requirements as to shattering. With pressure differences, there has been found a tendency, even of acrylic sheets, to shatter under impact.

Applicants have discovered that the tendency of an acrylic sheet to shatter under differences in pressure can be satisfactorily overcome by bonding an acrylic resin sheet to a layer of a transparent, tough, flexible material. The bond must be such that delamination does not occur over the extremes of temperature which may be encountered in service. i. e., about −70° F. to about 150° F. The structure comprising an acrylic resin layer bonded to the tough, flexible material must remain free from shattering tendencies over this same range of temperatures and yet retain to a high degree the various properties which have been the basis for the universal acceptance of acrylic resin sheets. Thus, the composite structure must retain transparency, good optical properties, freedom from color or development of color under strong actinic light, and the capacity for being bent, shaped, or fabricated with retention of the desirable properties mentioned above.

In actual practice, it has been found, there is considerable difficulty in meeting the above requirements. Even after applicants' discovery of the value of laminations for meeting the specific problem of overcoming shattering of acrylic resin sheets, there remained the necessity of meeting the other requirements. An attempt to bond directly a polyvinyl acetal sheet to a sheet of acrylic resin met with no real success because the two sheets failed to adhere to each other. After two sheets of acrylic resin had been heated and pressed to an interleaf of a polyvinyl acetal resin, the resulting laminate could still be shattered and delaminated under impact.

Applicants then discovered, however, that a proper bond could be obtained between acrylic sheets and polyvinyl acetal interlayers by the use of certain cements or adhesives based on acrylic polymers, the essential feature of which is the presence of a polymerized acid, such as acrylic acid or methacrylic acid, in the form of a copolymer.

Figure 2:
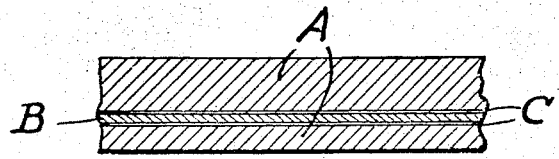
Figure 3:
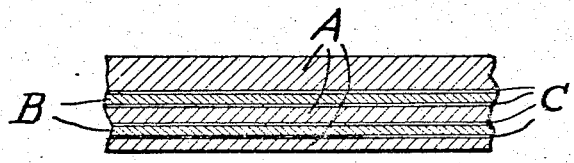
Figure 4:
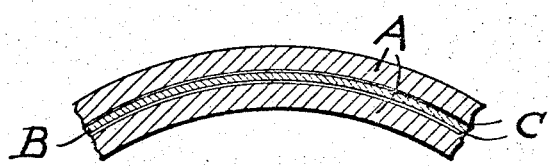
Figure 5:
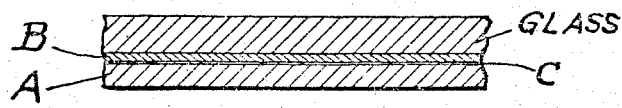

Various embodiments of this invention are shown by cross-sectional views in Figures 1 through 5. In Figure 1, two acrylic resin sheets are bonded to an interleafing layer of a polyvinyl acetal resin sheet with an acrylic polymer containing an acrylic acid. In Figure 2, the acrylic resin sheets are of unequal thickness. In Figure 3, the use of more than two sheets is shown interleafed with vinyl acetal resin sheets bonded with an acrylic polymer containing an acrylic acid. Figure 4 represents the cross section of acrylic sheets interleafed as above but given a curved shape. Figure 5 is illustrative of the laminating of an acrylic resin sheet to a sheet of a different kind of substance, in this case glass, to which the polyvinyl acetal sheet is bonded directly.

The laminated structures of this invention are prepared by joining under heat and pressure a plurality of sheets at least one of which is an acrylic resin sheet with an interlayer of a plasticized polyvinyl acetal resin which is made to adhere to said acrylic sheet by an acrylic resin containing about 5% to about 25% of polymeric acid. The laminated structure may be prepared from two or more acrylic resin sheets with an interlayer of plasticized polyvinyl acetal resin bonded between each pair of such sheets. The laminate may also be prepared with at least one layer of acrylic resin sheet bonded as described to a layer of plasticized polyvinyl acetal resin which is, in turn, bonded to a second sort of transparent sheet, such as silicate glass.

The acrylic resin sheets which are used are composed principally of one or more of the polymerized lower alkyl esters of methacrylic acid, such as methyl methacrylate, ethyl methacrylate, isopropyl methacrylate, or isobutyl methacrylate. There may also be used copolymers from a lower alkyl ester of methacrylic acid or mixture of such esters in preponderant amount together with a lesser amount of another organic polymerizable unsaturated compound which is miscible or compatible therewith, such as an ester of acrylic acid, examples of which are ethyl acrylate and butyl acrylate, or other polymerizable ethenoid, such as octyl methacrylate, styrene, or vinyl acetate. Where two or more sheets of acrylic resin are used in the laminated structure, they may be of the same composition or of different compositions, thus permitting the choice of resin sheets having the optimum properties for meeting the somewhat different aspects encountered in different kinds of installations.

Sheets suitable for use in this invention are available commercially under the trade names of "Plexiglas" and "Lucite." These sheets are essentially polymerized methyl methacrylate.

The polyvinyl acetal resins may be applied in this invention in the form of pre-formed sheets, or application may be made in other ways. For example, the polyvinyl acetal may be applied from a volatile solvent to one or more of the rigid sheets to be used for the lamination, as to a silicate glass sheet which is to be bonded to an acrylic resin sheet or to an acrylic resin sheet already coated with the adhesive.

The polyvinyl acetals have an advantage in being readily sheeted in a number of ways, as by rollers. Sheets or films from about 0.01 to about 0.3 of an inch in thickness are generally suitable for interlayers. The thickness selected will depend in part upon the particular polyvinyl acetal resin and its plasticization. It will also depend in part upon the nature of the laminated structure to be made therewith and the requirements to be met thereby.

Plasticized polyvinyl acetal resin sheets are prepared by known methods from polyvinyl butyrals, polyvinyl acetals, polyvinyl formals, and the like by mixing such resins with plasticizers. The polyvinyl acetal resins are prepared by acetalization of polyvinyl alcohol or partially hydrolyzed polyvinyl esters with such aldehydes as formaldehyde, acetaldehyde, propionaldehyde, butaldehyde, valeraldehyde, or hexaldehyde, or mixtures thereof. By varying the extent of saponification or hydrolysis and by varying the degree of acetalization, one effects some variation in properties, particularly as to compatibility with solvents and plasticizers. Such variations are incidental to the present invention, but recognition of such variations will permit those skilled in the art to select the most suitable type of polyvinyl acetal resin for meeting the specific requirements of any given problem. The so-called "incomplete" polyvinyl acetal resins are of particular value.

The polyvinyl acetal resins by themselves lack the flexibility and toughness which are necessary at low temperatures to accomplish the desired results. This difficulty, however, is readily overcome by the use of plasticizers, which, in general, are high-boiling liquids which are solvents therefor or organic compounds compatible therewith. These may be selected from a great variety of organic compounds with due consideration of the particular polyvinyl acetal resin being used and the requirements to be met by the laminated structure, including such factors as mechanical strength, temperatures to be encountered, necessity for resistance to water, conditions of laminating, stability to light, etc. It is desirable to select plasticizers which have the least tendency to migrate from the polyvinyl acetal layer into the acrylic sheet and yet give clarity in the polyvinyl acetal sheet at the lowest temperatures to be encountered. Mixtures of plasticizers are often of particular value, preventing development of turbidity and the exudation of plasticizer.

There may be used from about 25 to about 100 parts of plasticizer per 100 parts of polyvinyl acetal resin, depending upon the particular resin, the particular plasticizer, and the properties required in the final product. Thus, the total composition used for the interlayer may comprise from about 20% to about 50% of plasticizer.

Plasticizers which have been recommended for use with the various polyvinyl acetals include the following: Esters of phthalic acid, such as dibutyl phthalate, butyl capryl phthalate, diethyl phthalate, tetrahydrofurfuryl phthalate, di(ethoxyethyl) phthalate, di($\beta$-butoxyethyl) phthalate, dioctyl phthalate, glycol propionate phthalate, etc., esters of open chain dibasic acids, such as dibutyl sebacate, dibenzyl sebacate, dicapryl sebacate, diisoamyl maleate, dibenzyl maleate, dioctyl succinate, di(alkoxyethyl) sebacates, succinates, adipates, and the like, mixed ethers and esters, such as the ethyl ether of the monodiethylene glycol ester of succinic acid, or phthalic acid, or diglycol propionate phthalate, trimethylene glycol ditetrahydrofuroate, alkyl (ethyl, butyl) phthalyl ethyl glycolate, etc., diesters of polyglycols, such as the diethylene glycol esters of acetic, propionic, butyric, hexoic, etc., acids, alkyl polysiloxanes, toluene sulfonamides, triamyl phosphate, tricresyl phosphate, or trialkyl citrates, such as the tributyl, trihexyl, tripropyl or tri(ethoxyethyl) citrates, and other high-boiling compounds compatible with polyvinyl acetal resins within the required limits of temperature. Alkyl polysiloxanes are silicon resins having an alkyl group directly attached to silicon and having the silicon atoms joined to each other through oxygen.

Polyvinyl acetal resins are available commercially under such trade names as "Formvar," "Alvar," "Butvar," "Vinylite X," "Butacite," etc. Some of the commercial products are plasticized suitably for applications in which low temperatures may be encountered. The others may be treated with plasticizers to any desired extent.

As an adhesive to secure proper and adequate bonding of polyvinyl acetal resin and acrylic resin, there is used a film or layer between said resins comprising an acrylic ester polymer with an acid content of about 5% to about 25%. Acid contents of 10% to 15% are preferred. There may be used copolymers of esters of acrylic and/or methacrylic and/or other $\alpha$-alkacrylic acids with acrylic, methacrylic, and/or other $\alpha$-alkacrylic acids. A great variety of such acrylic esters may be used in the preparation of the polymers or copolymers. The lower alkyl esters, such as the methyl, ethyl, propyl, butyl, isobutyl acrylates and/or methacrylates are preferred, but higher esters or mixtures having higher esters of such acids may also be used, such as, for example, the hexyl, 2-ethyl hexyl, octyl, and cetyl esters. Furthermore, other polymerizable ethenoids may be used in conjunction with the acrylic esters, provided the acrylic ester portion of the resulting copolymer forms the major portion thereof.

Vinyl acetate has been found especially useful as a second type of polymerizable ethenoid, and amounts of vinyl acetate up to about 45% of the total weight of monomer may be employed. As the proportion of vinyl acetate exceeds 50%, the adhesive properties of the copolymers formed therewith drop off rapidly. In place of vinyl acetate, there may be used other vinyl esters, such as the propionate, acetate-butyrate, acetate-chloride, or styrene, or other polymerizable ethenoid compatible and miscible with acrylic type esters.

It has further been found that better adhesion is obtained with polymers of high molecular weight over that obtained with polymers of low molecular weight. The increase in molecular weight in general may be followed by the increase in viscosity of solutions of polymers in suitable solvents, such as ethylene dichloride and alcohol, benzene, ethyl acetate, methyl ethyl ketone, etc.

Since the adhesive layer is most effectively applied from a solvent solution, the only limitation as to viscosity rests upon the fact that highly viscous solutions may be somewhat difficult to apply. Thus, solutions of high viscosity tend to "cobweb" when sprayed, but may be applied by brushing and roller coating.

The amount of adhesive polymer used between acrylic resin sheet and polyvinyl acetal interlayer may be varied over a considerable range. Satisfactory results have been obtained with as little as three milligrams of polymer solids per square inch and with amounts exceeding 100 milligrams per square inch. Thin films are generally desired, as these provide the required adhesion with economy of material. Thin films also present an advantage in permitting more rapid drying and removal of solvent.

Any of the above-mentioned methods, spraying, brushing, or roller coating, or other method, such as dipping, may be used to apply the adhesive composition to the acrylic resin or to the polyvinyl acetal layer or to both. Solvent is then desirably removed by drying or by heating.

The lamination may then be prepared by forming an assembly of acrylic sheet and polyvinyl resin layer with the adhesive between the two and pressing the assembly to effect contact. The assembly is then heated under pressure.

Temperatures of about 65° C. to about 135° C. may be used, the temperature being sufficient to permit shaping of the interlayer to the acrylic sheet and to cause bonding of interlayer and acrylic sheet, but below that at which the acrylic sheet will become badly distorted.

While the present invention is directed primarily to the preparation of laminated structures composed of a plurality of acrylic resin sheets interleafed with polyvinyl acetal resin bonded thereto with acrylic ester polymers with about 5% to about 25% free acid, the invention is also directed to laminates in which, in addition to acrylic resin sheet and polyvinyl acetal resin interlayer, there may be another type of transparent sheet, in particular silicate glass, which bonds itself directly to the polyvinyl acetal layer. It will be evident that in such cases the final laminated structure no longer possesses the capacity of being readily shaped. The shape will depend upon the shape of the glass prior to lamination.

This invention is illustrated by the following examples:

*Example 1*

A mixture of 10 parts of acrylic acid, 90 parts of methyl acrylate, 0.05 part of benzoyl peroxide, and 100 parts of ethylene dichloride was gently refluxed for eighteen hours, a solution of 0.02 part of benzoyl peroxide in five parts of ethylene dichloride being added to the mixture eight hours after refluxing had commenced. The product was a very viscous, turbid mass which became clear and colorless when diluted with fifty parts of 95% ethyl alcohol.

A 10% solution of the above copolymer in a mixture of ethylene dichloride and ethyl alcohol, 2:1, was brushed onto one side of each of two pieces of acrylic resin sheet, 4" x 4" x 0.125" in dimensions. The amount of copolymer on the sheets was about 0.05 gram per square inch of surface. The coated sheets were dried for one half hour at 30° C. and then for four hours at 70°–80° C. The pieces, while still hot, were assembled with a 4" x 4" x 0.015" sheet of polyvinyl butyral resin from a 95% hydrolyzed polyvinyl acetate acetalized with butyraldehyde to the extent of 67% and plasticized with dibutyl sebacate and dibutyl phthalate to the extent of 37.5% of the total composition, placed between the two coated surfaces of the acrylic resin sheet, and the three layers were then pressed lightly together to effect preliminary contacting by passing them between rubber rolls. The resulting assembly was placed in an autoclave containing white mineral oil and supported therein between rigid glass plates so that it could not sag or buckle when soft. The contents of the autoclave were then maintained at 125° C. and 150 pounds per square inch nitrogen pressure for two hours, after which they were cooled to 50° C. while the pressure was maintained. The resulting lamination was clear, free from bubbles or other laminating defect, and well struck.

It was placed in a wooden frame and pierced with a .22 caliber long rifle bullet. In passing through the lamination, the bullet produced a few short cracks radiating from the hole in the acrylic resin sheets. There resulted, however, no separation of the acrylic resin sheets from the plasticized polyvinyl butyral film.

A 4" x 4" lamination was prepared in the same manner as above except that no adhesive coating was applied. This lamination, while of good appearance when removed from the autoclave, nevertheless could be pried apart with a blunt instrument without any difficulty. When pierced with a .22 caliber long rifle bullet, the unit completely delaminated.

*Example 2*

A mixture of five parts of acrylic acid, 32 parts of ethyl acrylate, 63 parts of methyl methacrylate, 0.05 part of benzoyl peroxide, and 100 parts of ethylene dichloride was heated under reflux for about ten hours. An additional 0.05 part of benzoyl peroxide in ten parts of ethylene dichloride was added at this point, and heating was continued for another eight hours. The resulting copolymer was taken up in a 2:1 mixture of ethylene dichloride and ethyl alcohol to form approximately a 10% solution.

This solution was applied to pieces of Plexiglas sheet which were 0.25 inch in thickness by brushing. The solvent was then allowed to evaporate at room temperature, leaving thin films on the Plexiglas pieces. The residual solvent in these films was evaporated in an oven at 70°–80° C.

The two pieces of Plexiglas were then at once pressed onto a 0.02" thick sheet of polyvinyl butyral resin prepared with a considerable portion of polyvinyl alcohol groups free and plasticized with about 30% of diglycol dihexoate, the sides carrying the films being placed against the polyvinyl resin. The resulting assembly was placed between metal plates and autoclaved at 125° C. and 150 pounds per square inch pressure for two hours. The autoclave and its contents were then permitted to cool below 50° C. before the laminated structure was removed.

It was clear, free from bubbles, and highly resistant to delamination, even after being chilled with carbon dioxide snow. There was good adhesion of acrylic sheets to polyvinyl sheet, and, when the laminate was pierced with a bullet, there was but a small cone of flying particles. There was but little spalling about the bullet hole and but little separation about the hole.

Example 3

A solution of adhesive was prepared from 10 parts of acrylic acid, 30 parts of ethyl acrylate, and 60 parts of methyl methacrylate, according to the procedure described in Example 2. The adhesive was applied in the same way to sheets of Plexiglas and a laminated assembly prepared with the same lot of polyvinyl butyral sheet. After the same type of treatment in the autoclave, a highly satisfactory laminate was obtained. It was clear, free from bubbles, and free from any tendency to delaminate. When subjected to the bullet test, there was little spalling about the bullet hole and no separation.

Example 4

The procedure of Examples 2 and 3 was followed, all materials being the same except that the adhesive was prepared with 15 parts of acrylic acid, 28 parts of ethyl acrylate, and 57 parts of methyl methacrylate. The final product had excellent properties as to clarity, freedom from bubbles, lack of tendency to delaminate, and minimized tendency to spall about bullet holes made therein even when the sheet was under a condsiderable pressure differential.

Example 5

The procedure described in the above examples was followed, but the adhesive used was made with 10 parts of methacrylic acid, 30 parts of ethyl acrylate, and 60 parts of methyl methacrylate. The final produce had excellent properties in all respects. It showed no tendency to separate under the bullet test.

Example 6

The same general procedure was followed, but the adhesive was prepared from 15 parts of acrylic acid and 85 parts of ethyl methacrylate. There were used the same type of methyl methacrylate resin sheets as used in Example 1 and the same type of plasticized polyvinyl butyral sheet. The final product had excellent properties in all respects. There was no delamination about holes made by bullets fired through the laminate.

Example 7

The same general procedure was followed again, but the adhesive was prepared from 6 parts of acrylic acid, 23 parts of ethyl acrylate, 24 parts of vinyl acetate, and 47 parts of methyl methacrylate. The properties of the final laminate were excellent. There was no separation about bullet holes.

While the diameter of the holes in the acrylate sheets was approximately that of the bullets, it was frequently noticed that the holes in the interleaf of polyvinyl acetal resin were considerably smaller and, with thicker sheets than used above, the holes became almost self-sealing. In any case, they could be readily plugged with a small nipple. Such convenient repair is an advantage in sealing holes in a pressurized enclosure.

Example 8

An adhesive was made according to the procedures shown in Examples 1 and 2 with 10 parts of acrylic acid, 30 parts of vinyl acetate, and 60 parts of methyl methacrylate. This adhesive was applied to both sides of a piece of polyvinyl butyral resin sheet having a large proportion of free hydroxyl groups and being plasticized with about 50 parts of a mixture of dibutyl phthalate and butyl laurate per 100 parts of polyvinyl resin. The solvent was evaporated as before and the coated sheet used for the middle sheet between two pieces of hard acrylic resin sheet. The polyvinyl resin sheet was 0.03 of an inch thick and the acrylate sheets were 0.125 of an inch.

After the preliminary assembly had been prepared, it was heated in an autoclave at 115° C. under 150 pounds of pressure for three hours. The resulting product was clear, free from bubbles, and resistant to all attempts to delaminate it. Bullet holes through the sheet did not show a large area of spalling. Flying particles from the inner acrylic sheet were few in number. The holes could be readily plugged.

Example 9

An adhesive was prepared as above from 15 parts of acrylic acid, 25 parts of vinyl acetate, and 60 parts of methyl methacrylate. A thin coat of the solution of the polymer made from this combination was applied by brushing to both sides of a piece of a sheet of polyvinyl acetal plasticized to an extent of 45% with a mixture of dibutyl sebacate, di(ethoxyethyl) phthalate, and diethyl phthalate. A thin coating was also applied to one side of each of two pieces of an acrylic resin sheet prepared from methyl methacrylate and ethyl methacrylate. Solvent was removed by gentle warming. An assembly was prepared from the three pieces and autoclaved at 110°–120° C. for four hours at a pressure of 125 pounds per square inch. The resulting structure was cooled under pressure. The product was a highly satisfactory one. It showed excellent adhesion between the acrylic layers and the softer polyvinyl layer. It was not delaminated when struck or pierced.

Example 10

An adhesive was prepared from 10 parts of acrylic acid, 30 parts of vinyl acetate, and 60 parts of methyl methacrylate, as in Example 8. The solution of this polymeric adhesive was applied to one face of a piece of polymethyl methacrylate sheet, 20″ x 22″ x 0.125″, and to one face of a piece of similar sheet, 20″ x 22″ x 0.250″. The solvent was permitted to evaporate at room temperature. The two pieces were then warmed in an oven to 60° C. and at once assembled over a sheet, 20″ x 22″ x 0.03″, of incomplete polyvinyl butyral, acetalized to about 65%, and plasticized to an extent of about 40% with dibutyl sebacate and dimethyl phthalate. This assembly was pressed between rollers and then processed in an autoclave at 120°–125° C. under 150 pounds per square inch pressure for about two hours. It was cooled in the autoclave under pressure.

The laminated sheet thus formed was cooled to −25° F. and clamped, with the heavier layer of acrylic sheet outermost, over an open face of a chamber which was pressure-tight. Carbon dioxide gas was forced into the chamber to bring the pressure therein to eight pounds per square inch. The laminated window was then used as the target of a .50 caliber machine gun. The sheet was pierced by the bullets, but no separation resulted even though some cracks formed.

The preparation of laminated windows was repeated several times with the same materials and the same procedure. Additional tests were made with the windows under an eight-pound pressure but with the sheets at 70° F. and 140° F. In no case was there excessive spalling or separation.

*Example 11*

The procedure detailed in Example 10 was applied to a laminated structure made with one piece of polymethyl methacrylate, 12″ x 12″ x 0.060″, and another, 12″ x 12″ x 0.375″, and a piece of plasticized incomplete polyvinyl butyral sheet, 12″ x 12″ x 0.015″, plasticized with about 35% of glycol dihexoate.

The final products were tested in the pressure chamber under eight pounds per square inch pressure with the heavier layer of acrylic resin on the outer surface. Bullets were fired through the laminated sheet from a .30 caliber rifle. No delamination occurred even at −70° F.

The significant feature of all the above laminated structures is the tenacious bonding of the acrylic sheet to the tough, flexible interlayer at all temperatures. This adhesion prevents the acrylic sheet from breaking apart even under pressure differentials and prevents spalling around a bullet hole and reduces flying particles to a minimum.

We claim:

1. A laminated structure resisting delamination even at low temperatures under shock and comprising a plurality of hard acrylic resin sheets interleafed with layers of polyvinyl acetal resin which is plasticized sufficiently to remain tough and elastic in the cold and which is bonded to said acrylic resin sheets with an intermediate film of a copolymer comprising in major proportion an acrylic ester and about 5% to 15% of an acrylic acid.

2. A laminated structure resisting delamination even at low temperatures under shock and comprising a plurality of sheets, at least one of which is a hard acrylic resin sheet which is bonded to a plasticized incomplete polyvinyl acetal resin sheet with a layer intermediate thereto of a copolymer comprising a major proportion of an acrylic ester and from about 5% to about 15% of an acrylic acid.

3. A laminated structure resisting delamination even at low temperatures under shock and comprising a plurality of resin sheets, at least one of which is a polymethyl methacrylate sheet which is bonded to a polyvinyl acetal resin sheet plasticized to an extent to maintain said resin sheet tough and flexible in the cold, said bonding being accomplished with a copolymer comprising a major proportion of an ester of acrylic acid and about 5% to about 15% of an acrylic acid.

4. A laminated structure resisting delamination even at low temperatures under shock and comprising a plurality of resin sheets, at least one of which is a polymethyl methacrylate sheet which is bonded to a polyvinyl butyral resin sheet plasticized to an extent to maintain said resin sheet tough and flexible in the cold, said bonding being accomplished with a copolymer comprising a major proportion of an ester of acrylic acid and about 5% to about 15% of an acrylic acid.

5. A laminated structure resisting delamination even at low temperatures under shock and comprising a plurality of resin sheets, at least one of which is a polymethyl methacrylate sheet which is bonded to an incomplete polyvinyl butyral resin sheet containing 20% to 50% of a plasticizer compatible therewith, said bonding between said methacrylate sheet and polyvinyl butyral resin sheet being effected with a copolymer comprising in major proportion an acrylic ester and 5% to 15% of an acrylic acid.

6. A laminated structure resisting delamination even at low temperatures under shock and comprising a plurality of polymethyl methacrylate resin sheets interleafed with an incomplete polyvinyl acetal resin which is rendered tough and elastic at low temperatures with 20% to 50% of a plasticizer compatible therewith and which is bonded to said methacrylate resin sheet with a film of a copolymer of a lower alkyl ester of acrylic acid and 5% to 15% of acrylic acid.

7. A laminated structure resisting delamination even at low temperatures under shock and comprising a plurality of polymethyl methacrylate resin sheets interleafed with an incomplete polyvinyl acetal resin which is rendered tough and elastic at low temperatures with 20% to 50% of a plasticizer compatible therewith and which is bonded to said methacrylate resin sheet with a film of a copolymer of a lower alkyl ester of acrylic acid in major proportion, vinyl acetate, and 5% to 15% of an acrylic acid.

8. A laminated structure resisting delamination even at low temperatures under shock and comprising a plurality of resin sheets, at least one of which is a polymethyl methacrylate sheet which is bonded to a polyvinyl acetal resin sheet plasticized to an extent to maintain said resin sheet tough and flexible in the cold, said bonding being accomplished with a copolymer comprising a major proportion of an ester of methacrylic acid and about 5% to about 15% of an acrylic acid.

9. A laminated structure resisting delamination even at low temperatures under shock and comprising a plurality of polymethyl methacrylate resin sheets interleafed with an incomplete polyvinyl acetal resin which is rendered tough and elastic at low temperatures with 20% to 50% of a plasticizer compatible therewith and which is bonded to said methacrylate resin sheet with a film of a copolymer of a lower alkyl ester of methacrylic acid and 5% to 15% of an acrylic acid.

10. A laminated structure resisting delamination even at low temperatures under shock and comprising a plurality of polymerized methyl methacrylate resin sheets interleafed with an incomplete polyvinyl butyral resin which is rendered tough and elastic at low temperatures with 20% to 50% of plasticizer compatible therewith and which is bonded to said resin sheets with a layer of a copolymer of a lower alkyl ester of an acrylic acid and 10% to 15% of an acrylic acid.

HARRY T. NEHER.
LA VERNE N. BAUER.

(References on following page)

REFERENCES CITED

The following references are of record in the file of this patent:

UNITED STATES PATENTS

| Number | Name | Date |
|---|---|---|
| 2,042,485 | Ryan et al. | June 2, 1936 |
| 2,218,782 | Barnes | Oct. 22, 1940 |
| 2,229,781 | Weihe | Jan. 28, 1941 |
| 2,244,703 | Hubbuch | June 10, 1941 |
| 2,256,618 | Kistler | Sept. 23, 1941 |
| 2,327,846 | Kistler | Aug. 24, 1943 |
| 2,346,036 | Leary | Apr. 4, 1944 |
| 2,374,056 | Watkins | Apr. 17, 1945 |

FOREIGN PATENTS

| Number | Country | Date |
|---|---|---|
| 157,688 | Austria | Jan. 10, 1940 |